(12) United States Patent
Obeid et al.

(10) Patent No.: US 11,329,342 B2
(45) Date of Patent: May 10, 2022

(54) MOUNTING BRACKETS FOR RETAINING BATTERY PACK INTERNAL COMPONENTS

(71) Applicant: FORD GLOBAL TECHNOLOGIES, LLC, Dearborn, MI (US)

(72) Inventors: Tarek Obeid, Dearborn Heights, MI (US); Ihab Grace, Grosse Pointe Woods, MI (US); David J. Pfeiffer, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 137 days.

(21) Appl. No.: 16/690,806

(22) Filed: Nov. 21, 2019

(65) Prior Publication Data
US 2021/0159472 A1    May 27, 2021

(51) Int. Cl.
*H01M 50/20*    (2021.01)
*H01M 50/502*    (2021.01)

(52) U.S. Cl.
CPC ......... *H01M 50/20* (2021.01); *H01M 50/502* (2021.01)

(58) Field of Classification Search
CPC ............................ H01M 50/20; H01M 50/244
See application file for complete search history.

(56) References Cited

U.S. PATENT DOCUMENTS

2011/0206948 A1* 8/2011 Asai .................... H01M 10/652
429/7

FOREIGN PATENT DOCUMENTS

| CN | 203491626 U | 3/2014 |
|---|---|---|
| CN | 204083506 U | 1/2015 |
| CN | 204095713 U | 1/2015 |
| CN | 206856640 U | 1/2018 |

* cited by examiner

*Primary Examiner* — Maria Laios
*Assistant Examiner* — Bartholomew A Hornsby
(74) *Attorney, Agent, or Firm* — David B. Kelley; Carlson, Gaskey & Olds, P.C.

(57) ABSTRACT

This disclosure details exemplary battery pack designs for use in electrified vehicles. An exemplary battery pack may include an enclosure assembly, one or more battery arrays housed within the enclosure assembly, a first battery internal component (e.g., an array holding device, heat exchanger plate, tray, etc.) adjacent to the battery array, a mounting bracket mounted to the first battery internal component, and a second battery internal component (e.g., a wiring harness of an electrical distribution system) elevated above the first battery internal component by the mounting bracket.

19 Claims, 6 Drawing Sheets

MOUNTING BRACKETS FOR RETAINING BATTERY PACK INTERNAL COMPONENTS

TECHNICAL FIELD

This disclosure relates generally to battery packs, and more particularly to mounting brackets for positioning, retaining, and maintaining clearances for battery pack internal components.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by battery powered electric machines. Conventional motor vehicles, by contrast, rely exclusively on the internal combustion engine to propel the vehicle.

A high voltage battery pack typically powers the electric machines and other electrical loads of the electrified vehicle. An enclosure assembly of the battery pack houses a plurality of battery cells that store energy for powering these electrical loads. Various other internal components, including but not limited to a battery electric control module (BECM), a bussed electrical center (BEC), wiring, and input/output connectors, must also be packaged and retained inside the enclosure assembly while maintaining clearances in multiple directions.

SUMMARY

A battery pack according to an exemplary aspect of the present disclosure includes, among other things, an enclosure assembly, a first battery array housed within the enclosure assembly, a first battery internal component adjacent to the first battery array, a mounting bracket secured to the first battery internal component, and a second battery internal component elevated above the first battery internal component by the mounting bracket.

In a further non-limiting embodiment of the foregoing battery pack, the first battery internal component is an array holding device that is received over at least a portion of the first battery array to retain the first battery array relative to a tray of the enclosure assembly.

In a further non-limiting embodiment of either of the foregoing battery packs, the first battery internal component is a heat exchanger plate.

In a further non-limiting embodiment of any of the foregoing battery packs, the first battery internal component is a portion of a tray of the enclosure assembly.

In a further non-limiting embodiment of any of the foregoing battery packs, the second battery internal component is a wiring harness of an electrical distribution system.

In a further non-limiting embodiment of any of the foregoing battery packs, the wiring harness connects between the first battery array and either a bussed electrical center or a battery electric control module.

In a further non-limiting embodiment of any of the foregoing battery packs, the mounting bracket is secured to the first battery internal component by at least one fastener.

In a further non-limiting embodiment of any of the foregoing battery packs, a retainer device is secured to the mounting bracket. The second battery internal component is connected to the retainer device.

In a further non-limiting embodiment of any of the foregoing battery packs, the mounting bracket includes a lower plateau, an upper plateau spaced from the lower plateau along a Z-axis of the battery pack, and a bridge that connects the lower and upper plateaus. The retainer device is mounted to the upper plateau.

In a further non-limiting embodiment of any of the foregoing battery packs, the second battery internal component is secured to the retainer device by a piece of tape or by flexible clip arms of the retainer device.

A battery pack according to another exemplary aspect of the present disclosure includes, among other things, an enclosure assembly, a first battery array housed within the enclosure assembly, an array holding device received over at least a portion of the first battery array to retain the first battery array relative to the enclosure assembly, a mounting bracket secured to the array holding device, a retainer device secured to the mounting bracket, and a wiring harness connected to the retainer device.

In a further non-limiting embodiment of the foregoing battery pack, the wiring harness includes a first connector that is plugged into a second connector that protrudes from a lateral side surface of the first battery array.

In a further non-limiting embodiment of either of the foregoing battery packs, the first connector extends from a sense lead of the wiring harness.

In a further non-limiting embodiment of any of the foregoing battery packs, the array holding device is received over a foot of an array frame of the first battery array.

In a further non-limiting embodiment of any of the foregoing battery packs, the mounting bracket includes a lower plateau, an upper plateau spaced from the lower plateau along a Z-axis of the battery pack, and a bridge that connects the lower and upper plateaus. The retainer device is mounted to the upper plateau of the mounting bracket.

In a further non-limiting embodiment of any of the foregoing battery packs, the mounting bracket includes a bead formed in the bridge. The bead is configured for increasing a stiffness of the mounting bracket.

In a further non-limiting embodiment of any of the foregoing battery packs, the mounting bracket includes an anti-rotation tab that protrudes from the lower plateau at an opposite end of the lower plateau from the bridge. The anti-rotation tab contacts a side surface of the array holding device.

In a further non-limiting embodiment of any of the foregoing battery packs, the lower plateau includes a first opening for receiving a fastener for mounting the mounting bracket to the array holding device, and the upper plateau includes a second opening for receiving an anchoring prong of the retainer device.

In a further non-limiting embodiment of any of the foregoing battery packs, the retainer device includes an anchoring prong and a flat plate, and the wiring harness is connected to the flat plate by an adhesive or a tape.

In a further non-limiting embodiment of any of the foregoing battery packs, the retainer device includes an anchoring prong and a pair of flexible clip arms that are configured to receive and retain the wiring harness.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery pack designs for use in electrified vehicles. An exemplary battery pack may include an enclosure assembly, one or more battery arrays housed within the enclosure assembly, a first battery internal component (e.g., an array holding device, heat exchanger plate, tray, etc.) adjacent to the battery array, a mounting bracket mounted to the first battery internal component, and a second battery internal component (e.g., a wiring harness of an electrical distribution system) elevated above the first battery internal component by the mounting bracket. These and other features are discussed in greater detail in the following paragraphs of this detailed description.

Figure 1:
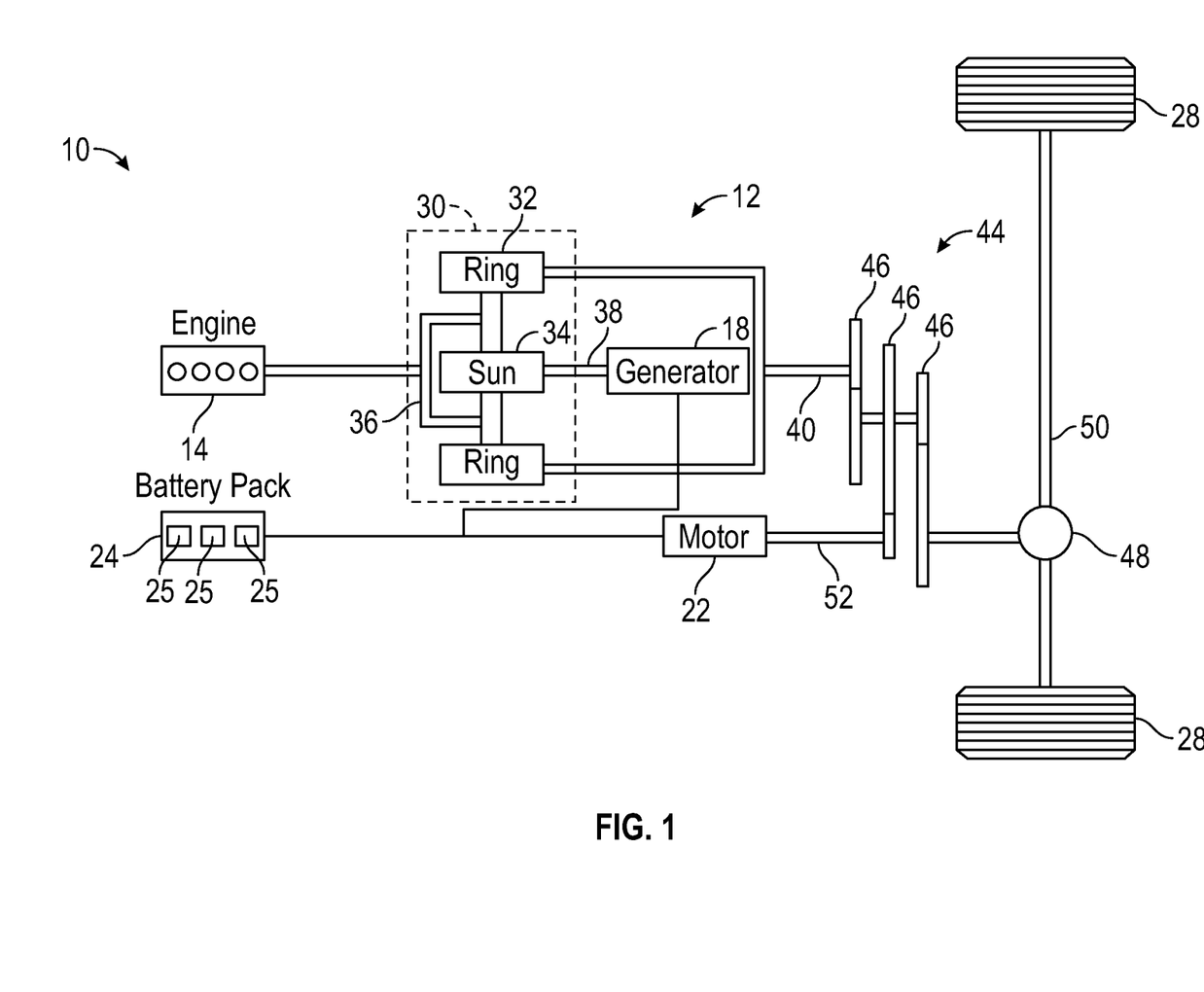
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery that includes a plurality of battery arrays 25 (i.e., battery assemblies or groupings of battery cells) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
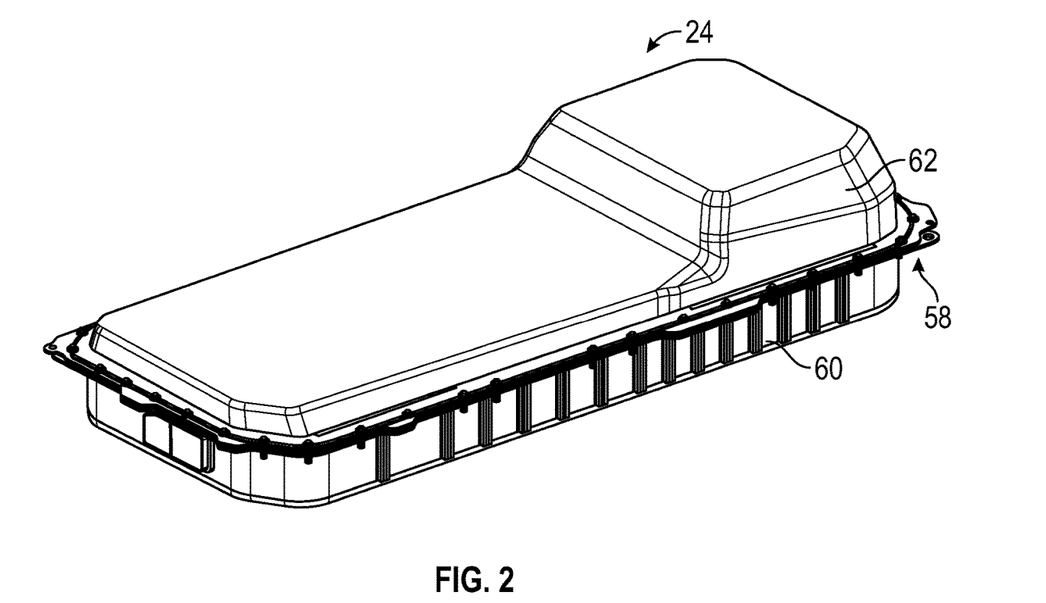
FIG. 2 illustrates a battery pack of an electrified vehicle.
Figure 3:
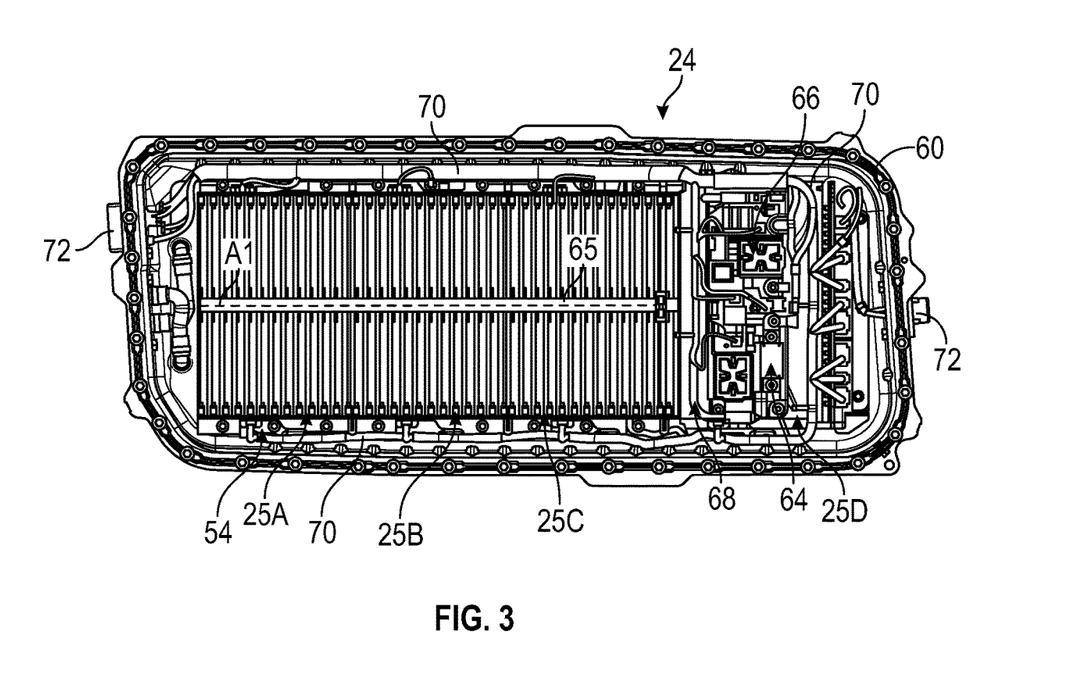
FIG. 3 is a top view of the battery pack of FIG. 2. A cover of an enclosure assembly of the battery pack is removed in FIG. 3 to better illustrate the battery internal components of the battery pack.

FIGS. 2 and 3 illustrate a battery pack 24 that can be employed within an electrified vehicle. For example, the battery pack 24 could be employed as part of the powertrain 10 of the electrified vehicle 12 of FIG. 1. FIG. 2 is an assembled, perspective view of the battery pack 24, and portions (e.g., a cover 62) of the battery pack 24 are removed in FIG. 3 in order to better visualize its internal contents.

The battery pack 24 may include a battery system 54 (best shown in FIG. 3) housed within an enclosure assembly 58. The enclosure assembly 58 may be a sealed enclosure and may embody any size, shape, and configuration within the scope of this disclosure. In an embodiment, the enclosure assembly 58 includes a tray 60 and a cover 62. During assembly, the battery system 54 may be positioned within the tray 60, and the cover 62 may then be fixedly secured to the tray 60 to seal the battery system 54 therein. The tray 60 and the cover 62 may be made of any material or combination of materials, including metallic and/or polymeric materials.

Select portions of the battery system 54 are shown removed from the enclosure assembly 58 in FIG. 4, which will now be described with continued reference to FIGS. 1, 2, and 3. The battery system 54 includes a plurality of battery cells 56 that store energy for powering various electrical loads of the electrified vehicle 12. The battery system 54 could include any number of battery cells 56 within the scope of this disclosure. Therefore, this disclosure is not limited to the exact configuration of the battery system 54 shown in FIGS. 3-4.

The battery cells 56 may be stacked side-by-side to construct a grouping of battery cells 56, sometimes referred to as a battery array. The battery cells 56 may be retained relative to one another by a plurality of array frames 63. The array frames 63 may be made of plastics or other materials. In an embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

Figure 4:
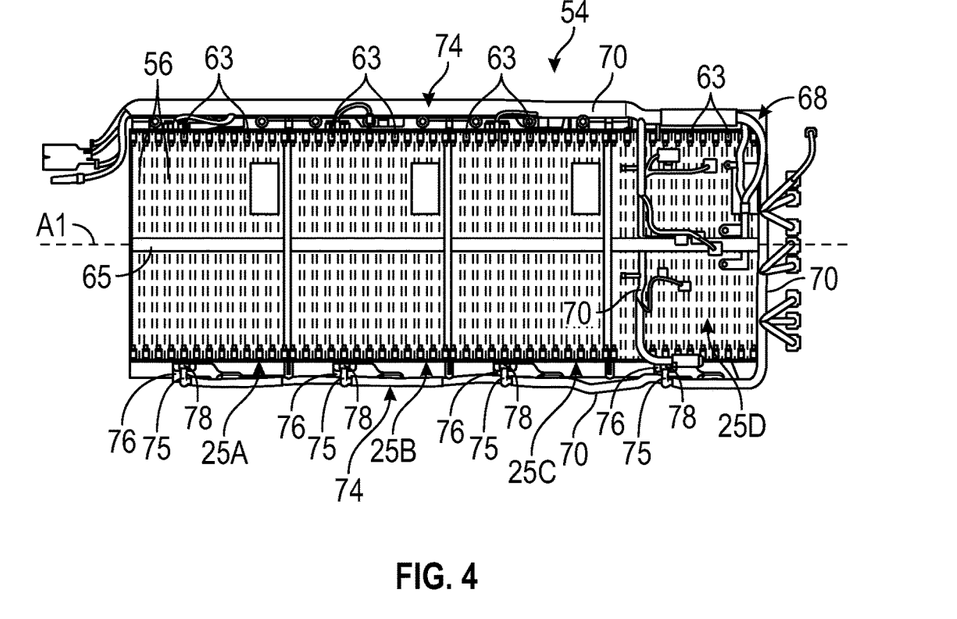
FIG. 4 illustrates a battery system of the battery pack of FIG. 2.

The battery system 54 depicted in FIGS. 3-4 includes a first battery array 25A, a second battery array 25B, a third battery array 25C, and a fourth battery array 25D. Although the battery system 54 is depicted as including four battery arrays, the battery pack 24 could include a greater or fewer number of battery arrays and still fall within the scope of this disclosure. Unless stated otherwise herein, when used without any alphabetic identifier immediately following the reference numeral, reference numeral "25" may refer to any of the battery arrays 25A-25D.

The battery cells 56 and the array frames 63 of each of the battery arrays 25 may be distributed along a longitudinal axis A1. In an embodiment, the longitudinal axis A1 is coaxial with a longitudinal axis of the tray 60. However, other arrangements and configurations of the battery cells 56 and the battery arrays 25 are also contemplated within the scope of this disclosure.

A retention strap 65 may optionally be used to retain the battery arrays 25 relative to one another along the longitudinal axis A1. One or more retention straps 65 may be wrapped around the battery arrays 25. The retention straps 65 may be a webbed strap made of polyester filament yarn that is woven into a single strap, similar to a composition of a seat belt, for example. Other structural compositions for the retention straps 65 are also contemplated within the scope of this disclosure, including straps of metal or polymer-based straps with continuous fibers such as glass or carbon running across their length.

The battery system 54 may include a plurality of electrical components (see features 64-72) that establish an electrical assembly of the battery system 54. The electrical components may include, but are not limited to, a bussed electrical center (BEC) 64, a battery electric control module (BECM) 66, an electrical distribution system (EDS) 68, which may include one or more wiring harnesses 70, a plurality of input/output (I/O) connectors 72, etc.

Figure 5:
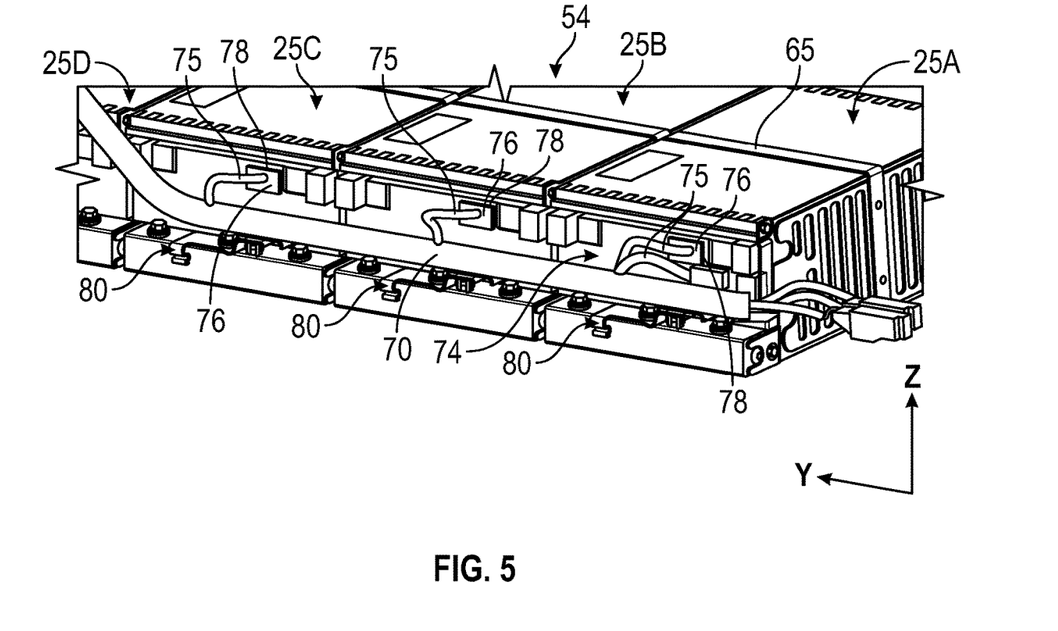
FIG. 5 is a partial side view of the battery system of FIG. 4.

Referring now primarily to FIGS. 3-5, the wiring harnesses 70 of the EDS 68 may be connected to the battery arrays 25 and the BEC 64 and/or the BECM 66 for monitoring the health of the battery cells 56 of each battery array 25. At least a portion of the wiring harnesses 70 may be routed along opposing lateral sides 74 of the battery system 54. The wiring harnesses 70 may include sense leads 75 that each include a connector 76 that must be plugged into a corresponding connector 78 located on the lateral sides 74 of the battery system 54. However, due to a limited amount of available hand clearance along the lateral sides 74 of the battery system 54, it can be difficult to plug the connectors 76 of the sense leads 75 into the corresponding connectors 78 of the battery arrays 25.

The battery system 54 may therefore employ one or more mounting brackets 80 for more easily routing and retaining the wiring harnesses 70 and for providing dual clearances in at least two directions (i.e., along both a Y-axis and Z-axis of the battery system 54). As further detailed below, the mounting brackets 80 elevate the wiring harnesses 70, thereby providing improved hand clearances for making the necessary electrical connections within the battery pack 24.

Figure 6:
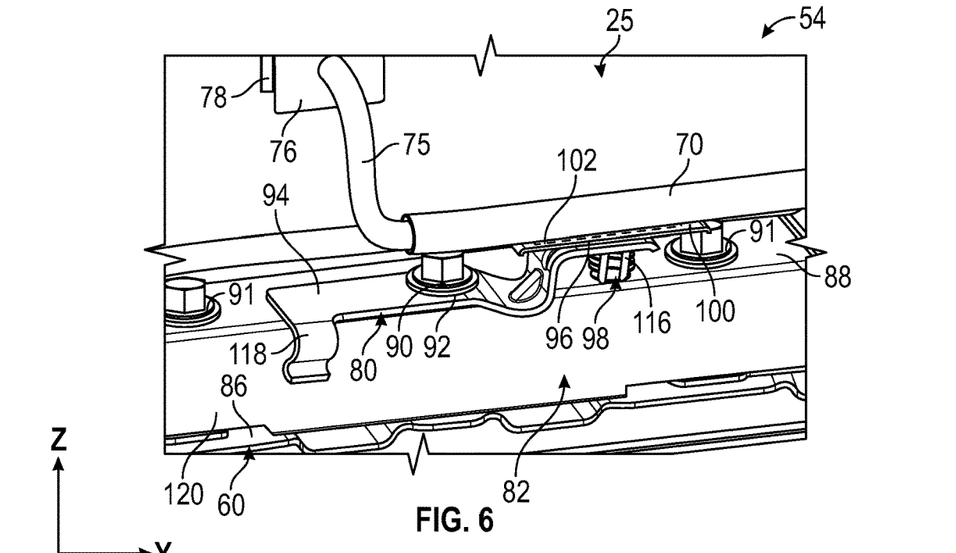
FIG. 6 is a blown-up view of select portions of FIG. 5.

FIG. 6 illustrate an exemplary mounting configuration of a wiring harness 70 of the battery system 54 described above. The wiring harness 70 is elevated in the Z-axis by a mounting bracket 80 in order to more easily connect a connector 76 of a sense lead 75 of the wiring harness 70 to a corresponding connector 78 of one of the battery arrays 25. Although shown as elevating a wiring harness 70, the mounting brackets 80 of this disclosure could be used to elevate a position of any battery internal component of the battery pack 24.

The mounting bracket 80 may be mounted to another battery internal component 82 of the battery pack 24. The battery internal component 82 may be any internal component of the battery pack 24 that can provide a relatively flat mounting surface 88 for mounting the mounting bracket 80 thereto.

Figure 7:
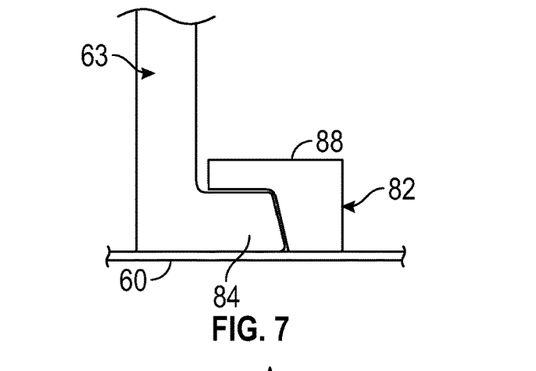
FIG. 7 illustrates an exemplary battery internal component of a battery pack.

In an embodiment, the battery internal component 82 is an array holding device configured for both holding down the battery arrays 25 and for establishing the mounting surface 88 for mounting the mounting bracket 80. The battery internal component 82 may be an extruded, metallic structure, for example. A portion (e.g., a foot 84) of each of the array frames 63 of the battery arrays 25 may be positioned under the battery internal component 82 for retaining the battery arrays 25 relative to the tray 60 of the enclosure assembly 58 (see, e.g., FIG. 7).

In another embodiment, the battery internal component 82 is a heat exchanger plate, which is sometimes referred to as a cold plate, that is configured to both conduct the heat out of the battery cells 56 and establish the mounting surface 88.

For example, the battery arrays 25 of the battery system 54 may be positioned in direct contact with or in close proximity to the battery internal component 82. In such an example, the battery internal component 82 may be part of a liquid cooling system that is associated with the battery system 54 and is configured for thermally managing the battery cells 56 of each battery array 25. For example, heat may be generated and released by the battery cells 56 during charging operations, discharging operations, extreme ambient conditions, or other conditions, and it may be desirable to remove the heat from the battery system 54 to improve capacity, life, and performance of the battery cells 56.

In yet another embodiment, the battery internal component 82 is a portion of the tray 60. For example, the battery internal component 82 could be a bulged portion of the tray 60 that protrudes outwardly from a floor 86 of the tray 60 and establishes the mounting surface 88 for mounting the mounting bracket 80.

The mounting bracket 80 may be mounted to the mounting surface 88 of the battery internal component 82 using one or more fasteners 90. In an embodiment, the fasteners 90 are bolts. The fastener 90 may be inserted through an opening 92 formed through a lower plateau 94 of the mounting bracket 80 and then into the battery internal component 82 in order to secure the mounting bracket 80 to the battery internal component 82. In another embodiment, the battery internal component 82 is fixedly secured to the tray 60 by one or more additional fasteners 91.

The mounting bracket 80 may additionally include an upper plateau 96 that is elevated above the lower plateau 94 in the Z-axis direction and is shifted laterally from the lower plateau 94 in the Y-axis direction. A retainer device 98 may be secured to the upper plateau 96 of the mounting bracket 80. The wiring harness 70 may then be retained relative to the upper plateau 96 of the mounting bracket 80 by the retainer device 98.

In an embodiment, the retainer device 98 includes a flat plate 100 (see FIG. 6). The wiring harness 70 may be secured to the flat plate 100, such as by an adhesive or tape 102.

Figure 8:
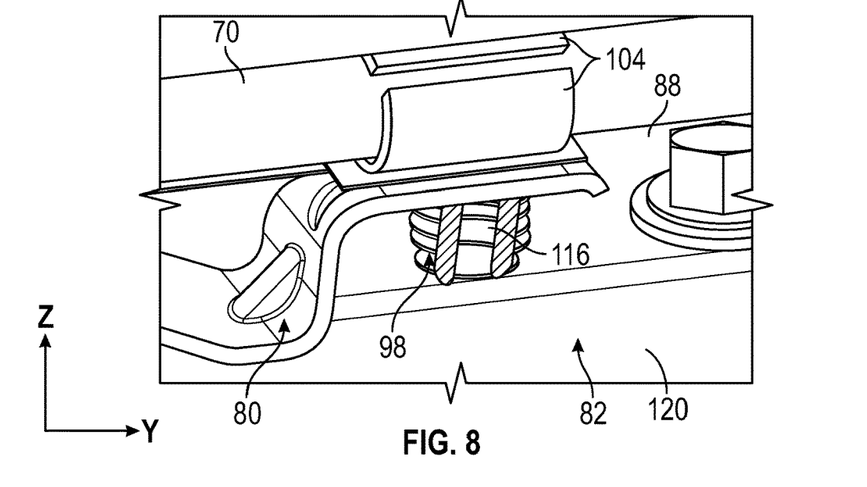
FIG. 8 illustrates an exemplary retaining device for use within a battery system.
Figure 9:
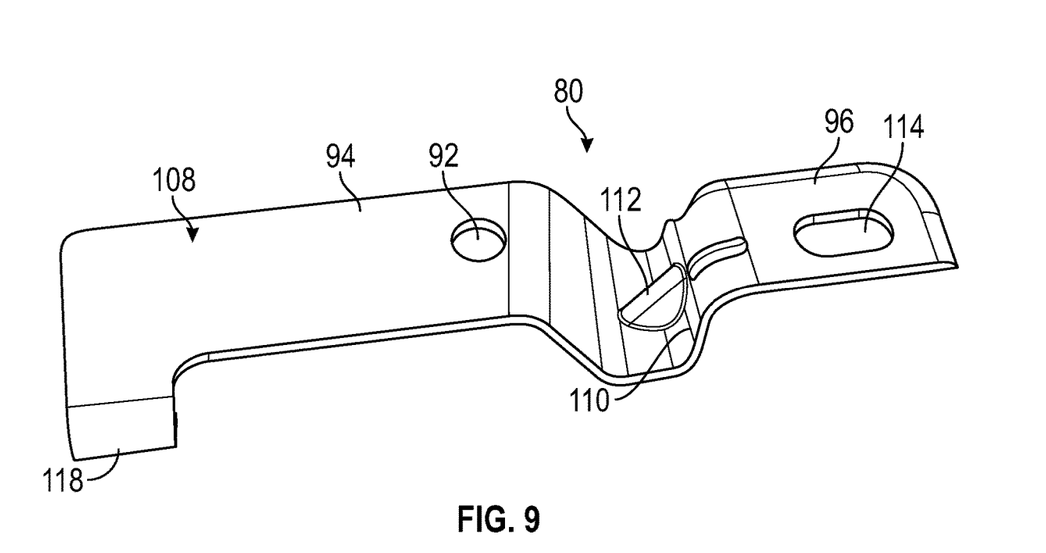
FIG. 9 is a perspective view of a mounting bracket for mounting battery internal components.
Figure 10:
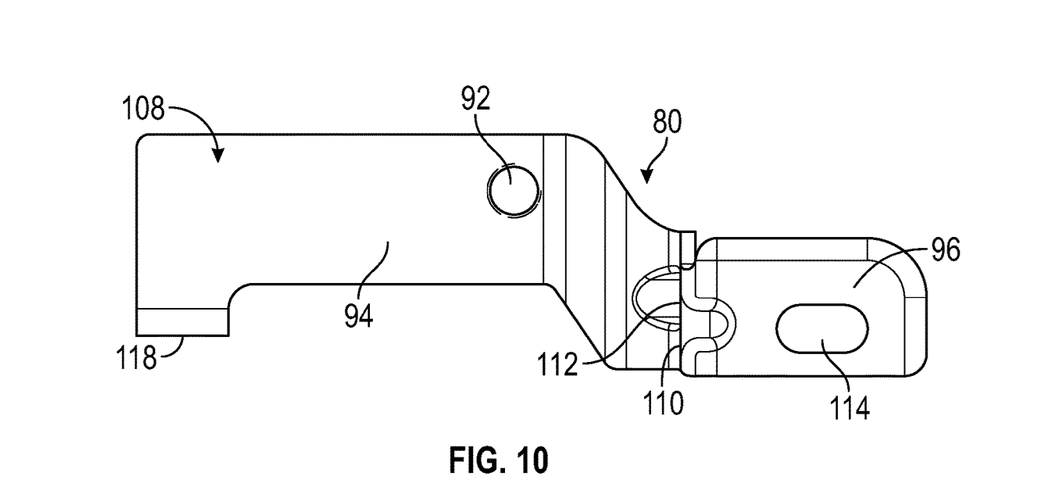
FIG. 10 is a top view of the mounting bracket of FIG. 9.
Figure 11:
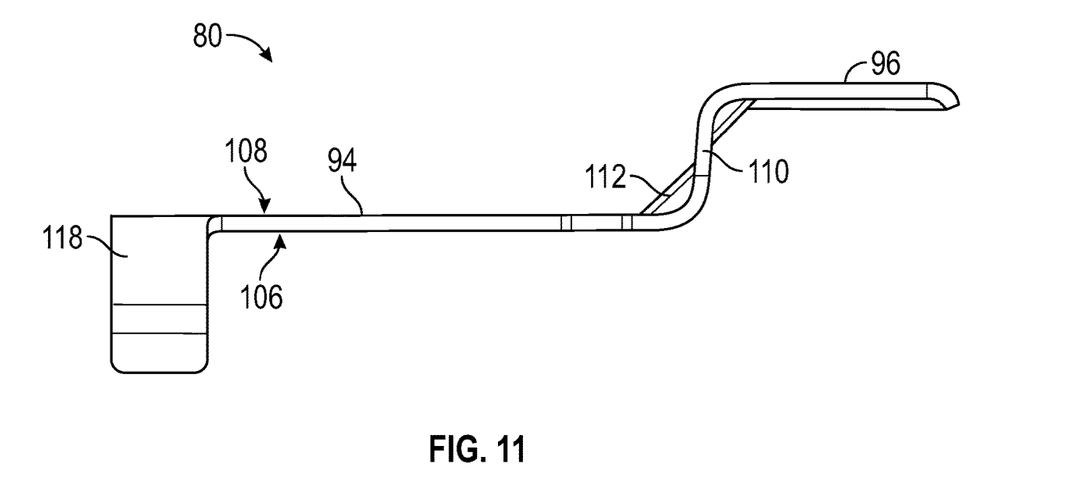
FIG. 11 is a side view of the mounting bracket of FIG. 9.
Figure 12:
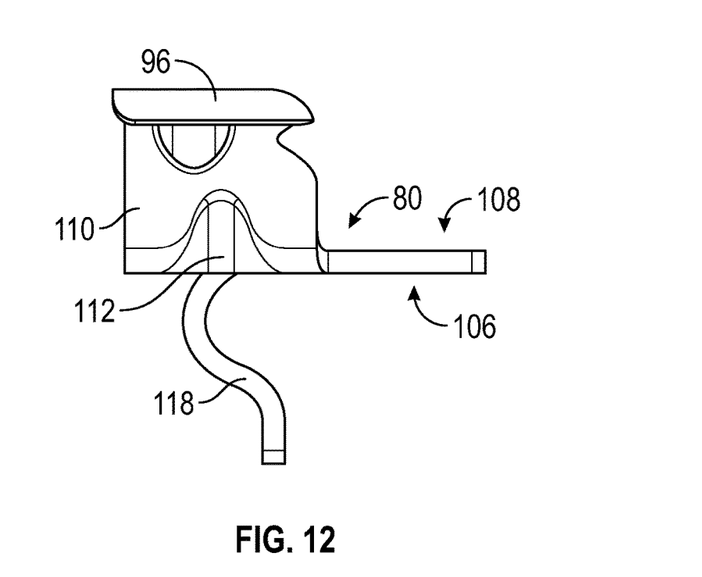
FIG. 12 is an end view of the mounting bracket of FIG. 9.

In another embodiment, the retainer device 98 includes a pair of flexible clip arms 104 that are configured to receive and retain the wiring harness 70 (see FIG. 8). For example, the wiring harness 70 may be snap-fit into place in the space between the flexible clip arms 104 for securing the wiring harness 70 to the retainer device 98.

FIGS. 9-12, with continued reference to FIG. 6, illustrate further details of the exemplary mounting bracket 80. In an embodiment, the mounting bracket 80 is constructed out of a metallic material, such as steel. However, other materials, including polymeric materials, could be utilized to manufacture the mounting bracket 80.

The mounting bracket 80 may include an inner surface 106 configured to interface with the mounting surface 88 of the battery internal component 82 and an outer surface 108 that faces away from the mounting surface 88. The lower plateau 94 and the upper plateau 96 of the mounting bracket 80 are established at the outer surface 108 of the mounting bracket 80.

A bridge 110 may connect the upper plateau 96 to the lower plateau 94 of the mounting bracket 80. A bead 112 may be formed in the bridge 110 for increasing the overall stiffness of the mounting bracket 80. The mounting bracket 80 may therefore exhibit improved noise, vibration, and harshness characteristics.

An opening 92 may be formed through the lower plateau 94 of the mounting bracket 80 for receiving the fastener 90. In an embodiment, the opening 92 of the lower plateau 94 is a round opening.

An additional opening 114 may be formed through the upper plateau 96 of the mounting bracket 80 for receiving an anchoring prong 116 of the retainer device 98. In an embodiment, the opening 114 is an elongated opening.

An anti-rotation tab 118 may protrude from the mounting bracket 80. In an embodiment, the anti-rotation tab 118 is curved and extends downwardly away from the lower plateau 94 at an opposite end from the bridge 110. The anti-rotation tab 118 may contact a side surface 120 of the battery internal component 82 to prevent outward rotation of the mounting bracket 80, thereby substantially preventing any twisting of the wiring harness 70.

The exemplary battery packs of this disclosure employ mounting brackets for positioning and retaining battery internal components at an elevated position within the battery pack. The exemplary mounting brackets may advantageously provide for dual clearances along two different directions, may act to transfer weight to other battery internal components, may control battery internal height clearances, may improve normal mode characteristics of the battery pack, and may provide for added flexibility when routing EDS wiring within battery packs.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
   an enclosure assembly;
   a first battery array housed within the enclosure assembly;
   a first battery internal component adjacent to the first battery array;
   a mounting bracket secured to the first battery internal component;
   a second battery internal component elevated above the first battery internal component by the mounting bracket; and
   a retainer device secured to the mounting bracket,
   wherein the second battery internal component is connected to the retainer device by a piece of tape or by flexible clip arms of the retainer device.

2. The battery pack as recited in claim 1, wherein the first battery internal component is an array holding device that is received over at least a portion of the first battery array to retain the first battery array relative to a tray of the enclosure assembly.

3. The battery pack as recited in claim 1, wherein the first battery internal component is a heat exchanger plate.

4. The battery pack as recited in claim 1, wherein the first battery internal component is a portion of a tray of the enclosure assembly.

5. The battery pack as recited in claim 1, wherein the second battery internal component is a wiring harness of an electrical distribution system.

6. The battery pack as recited in claim 5, wherein the wiring harness connects between the first battery array and either a bussed electrical center or a battery electric control module.

7. The battery pack as recited in claim 1, wherein the mounting bracket is secured to the first battery internal component by at least one fastener.

8. The battery pack as recited in claim 1, wherein the mounting bracket includes a lower plateau, an upper plateau spaced from the lower plateau along a Z-axis of the battery pack, and a bridge that connects the lower and upper plateaus, wherein the retainer device is mounted to the upper plateau.

9. A battery pack, comprising:
an enclosure assembly;
a first battery array housed within the enclosure assembly;
an array holding device received over at least a portion of the first battery array to retain the first battery array relative to the enclosure assembly;
a mounting bracket secured to the array holding device;
a retainer device secured to the mounting bracket; and
a wiring harness connected to the retainer device,
wherein the array holding device, the mounting bracket, and the retainer device are each separate and distinct components of the battery pack.

10. The battery pack as recited in claim 9, wherein the wiring harness includes a first connector that is plugged into a second connector that protrudes from a lateral side surface of the first battery array.

11. The battery pack as recited in claim 10, wherein the first connector extends from a sense lead of the wiring harness.

12. The battery pack as recited in claim 9, wherein the array holding device is received over a foot of an array frame of the first battery array.

13. The battery pack as recited in claim 9, wherein the mounting bracket includes a lower plateau, an upper plateau spaced from the lower plateau along a Z-axis of the battery pack, and a bridge that connects the lower and upper plateaus, wherein the retainer device is mounted to the upper plateau of the mounting bracket.

14. The battery pack as recited in claim 13, wherein the mounting bracket includes a bead formed in the bridge and configured for increasing a stiffness of the mounting bracket.

15. The battery pack as recited in claim 13, wherein the mounting bracket includes an anti-rotation tab that protrudes from the lower plateau at an opposite end of the lower plateau from the bridge, wherein the anti-rotation tab contacts a side surface of the array holding device.

16. The battery pack as recited in claim 13, wherein the lower plateau includes a first opening for receiving a fastener for mounting the mounting bracket to the array holding device, and the upper plateau includes a second opening for receiving an anchoring prong of the retainer device.

17. The battery pack as recited in claim 9, wherein the retainer device includes an anchoring prong and a flat plate, and the wiring harness is connected to the flat plate by an adhesive or a tape.

18. The battery pack as recited in claim 9, wherein the retainer device includes an anchoring prong and a pair of flexible clip arms that are configured to receive and retain the wiring harness.

19. A battery pack, comprising:
an enclosure assembly;
a first battery array housed within the enclosure assembly;
a first battery internal component adjacent to the first battery array;
a mounting bracket secured to the first battery internal component; and
a second battery internal component elevated above the first battery internal component by the mounting bracket,
wherein the mounting bracket includes a lower plateau, an upper plateau spaced from the lower plateau along a Z-axis of the battery pack, and a bridge that connects the lower and upper plateaus.

* * * * *